United States Patent
Orimoto

(10) Patent No.: US 10,356,259 B2
(45) Date of Patent: Jul. 16, 2019

(54) PROCESSING DEVICE, IMAGE FORMING APPARATUS, AND NON-TRANSITORY COMPUTER READABLE MEDIUM

(71) Applicant: FUJI XEROX CO., LTD., Tokyo (JP)

(72) Inventor: Asae Orimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 101 days.

(21) Appl. No.: 15/440,354

(22) Filed: Feb. 23, 2017

(65) Prior Publication Data

US 2018/0077295 A1   Mar. 15, 2018

(30) Foreign Application Priority Data

Sep. 14, 2016 (JP) ................. 2016-179320

(51) Int. Cl.
*G06F 3/0484* (2013.01)
*H04N 1/00* (2006.01)

(52) U.S. Cl.
CPC ....... *H04N 1/0049* (2013.01); *G06F 3/04842* (2013.01); *H04N 1/00411* (2013.01); *H04N 1/00424* (2013.01); *H04N 1/00474* (2013.01); *H04N 2201/0094* (2013.01)

(58) Field of Classification Search
CPC ............. H04N 1/0049; H04N 1/00411; H04N 1/00424; H04N 1/00474; G06F 3/04842
See application file for complete search history.

(56) References Cited

U.S. PATENT DOCUMENTS

| | | | | |
|---|---|---|---|---|
| 6,760,048 B1* | 7/2004 | Bates | ................... | G06F 3/0481 715/781 |
| 8,378,982 B2* | 2/2013 | Hautala | ................. | G06F 3/0481 345/173 |
| 2006/0224994 A1* | 10/2006 | Cheemalapati | ....... | G06F 3/0481 715/808 |
| 2009/0204927 A1* | 8/2009 | Terasaki | .................. | G06F 9/451 715/781 |
| 2010/0287498 A1* | 11/2010 | Palgon | .................... | G06F 9/451 715/802 |
| 2011/0148776 A1* | 6/2011 | Hautala | ................. | G06F 3/0481 345/173 |
| 2011/0214057 A1* | 9/2011 | Wakizaka | ............. | G06F 3/0488 715/702 |

(Continued)

FOREIGN PATENT DOCUMENTS

JP   2011-186605 A   9/2011

*Primary Examiner* — Dino Kujundzic
(74) *Attorney, Agent, or Firm* — Oliff PLC

(57) ABSTRACT

A processing device includes a receiver, an execution unit, and an image control unit. The receiver receives selection of a processing selector displayed on a display. The processing selector is related to predetermined processing and executes the predetermined processing when the processing selector is selected. The execution unit executes the predetermined processing when the selection of the processing selector is received. The image control unit controls displaying of an image on the display. When the image control unit causes the display to display a first image including the processing selector, the receiver takes a different approach to receiving the selection of the processing selector in accordance with whether a second image is superposed on part of the processing selector or the second image is not superposed on the processing selector.

10 Claims, 9 Drawing Sheets

(56) References Cited

U.S. PATENT DOCUMENTS

2014/0223361 A1* 8/2014 Huang .................. G06F 3/0481
715/808
2016/0378280 A1* 12/2016 Yamamoto ............ G06F 3/0482
715/790

* cited by examiner

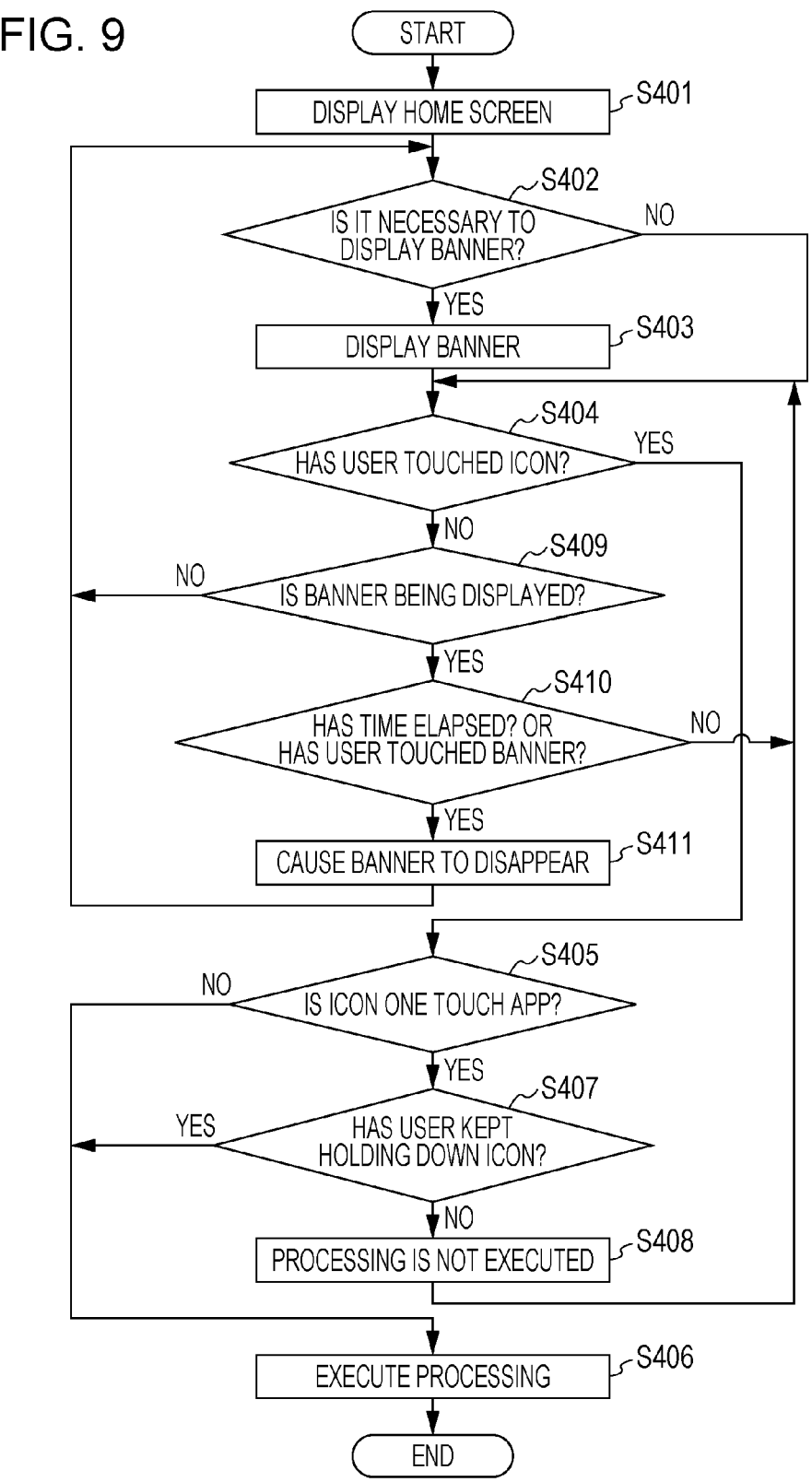

PROCESSING DEVICE, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-179320 filed Sep. 14, 2016.

BACKGROUND (i) Technical Field

The present invention relates to a processing device, an image forming apparatus, and a non-transitory computer readable medium.

(ii) Related Art

On a display of a processing device, a list of operations that are executable by an apparatus including this processing device may be displayed as an image. Normally, a user selects one of the operations to be executed from the list. This list is constituted by processing selectors arranged on the display, such as icons, related to predetermined operations. The user touches one of the processing selectors, such as an icon, to select an operation to be executed.

SUMMARY

According to an aspect of the invention, there is provided a processing device including a receiver, an execution unit, and an image control unit. The receiver receives selection of a processing selector displayed on a display. The processing selector is related to predetermined processing and executes the predetermined processing when the processing selector is selected. The execution unit executes the predetermined processing when the selection of the processing selector is received. The image control unit controls displaying of an image on the display. When the image control unit causes the display to display a first image including the processing selector, the receiver takes a different approach to receiving the selection of the processing selector in accordance with whether a second image is superposed on part of the processing selector or the second image is not superposed on the processing selector.

BRIEF DESCRIPTION OF THE DRAWINGS

Exemplary embodiments of the present invention will be described in detail based on the following figures, wherein:

FIG. 9 is a flowchart illustrating an operation performed by the controller in a fourth exemplary embodiment.

DETAILED DESCRIPTION (Overall Configuration of Image Forming Apparatus)

Figure 1:
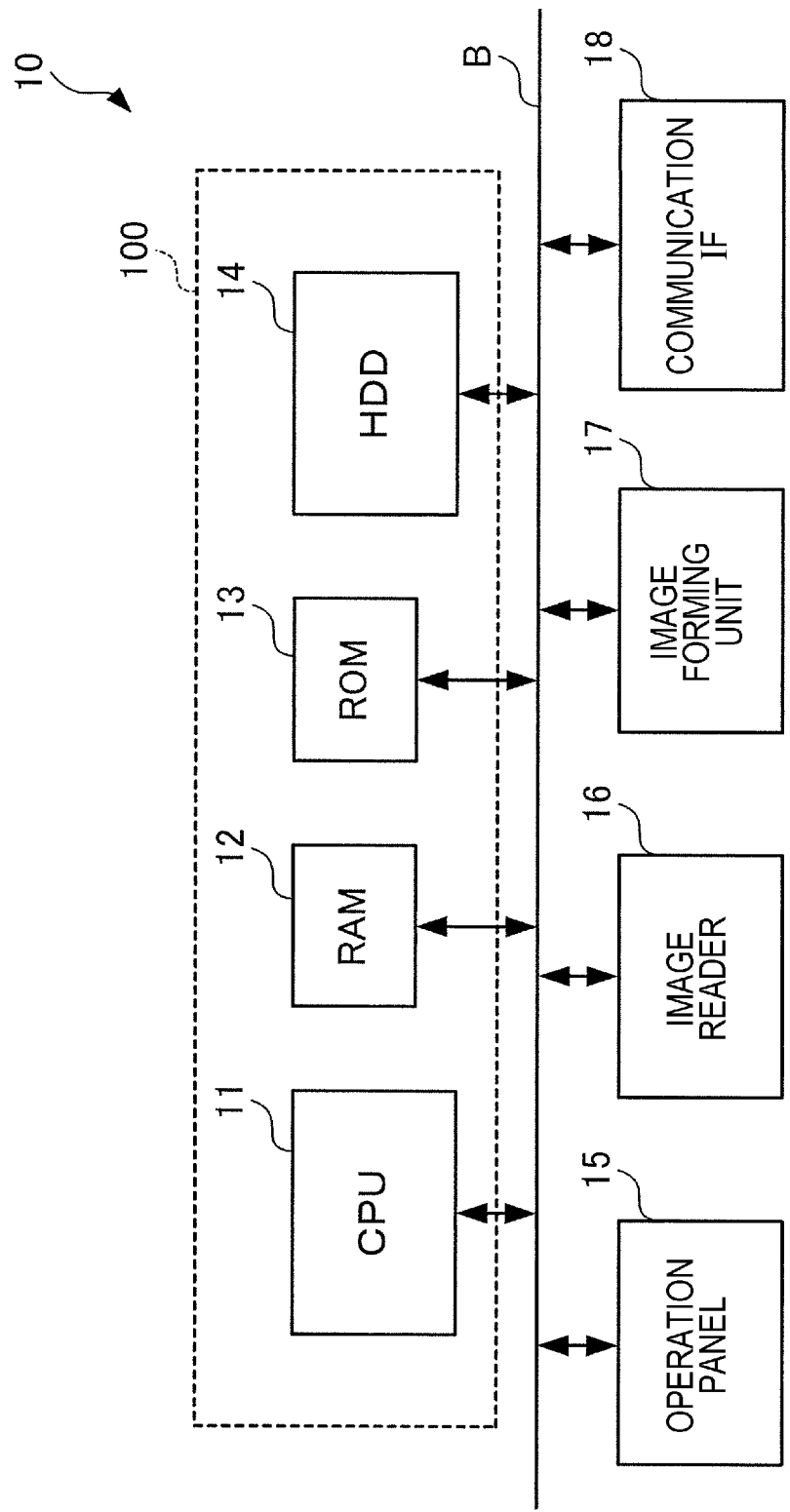
FIG. 1 is a block diagram illustrating an example of the hardware configuration of an image forming apparatus.

FIG. 1 is a block diagram illustrating an example of the hardware configuration of an image forming apparatus 10.

The image forming apparatus 10 forms an image on a recording medium, such as paper, and outputs the recording medium as a printed material. The image forming apparatus 10 has a printing function and also has other image processing functions such as a scanning function and a fax sending and receiving function.

As shown in FIG. 1, the image forming apparatus 10 includes a central processing unit (CPU) 11, a random access memory (RAM) 12, a read only memory (ROM) 13, a hard disk drive (HDD) 14, an operation panel 15, an image reader 16, an image forming unit 17, and a communication interface (IF) 18. These elements send and receive data with each other via a bus B.

The CPU 11 loads various programs stored in the ROM 13, for example, into the RAM 12, and executes the loaded programs so as to implement functions described below.

The RAM 12 is used as a work memory for the CPU 11.

The ROM 13 is a memory which stores various programs executed by the CPU 11.

The HDD 14 is a magnetic disk drive, for example, which stores image information read by the image reader 16 and image information used for forming an image by the image forming unit 17.

The operation panel 15 is a touch panel, for example, which displays various items of information and receives input of an operation from a user.

The image reader 16 reads an image recorded on a document. The image reader 16 is a scanner, for example, and may be a charge coupled device (CCD) scanner or a contact image sensor (CIS) scanner. In a CCD scanner, light applied to a document from a light source and reflected by the document is reduced by a lens and is received by CCDs. In a CIS scanner, light sequentially applied to a document from light emitting diode (LED) light sources and reflected by the document is received by a CIS.

The image forming unit 17 is an example of a print mechanism which forms an image on a recording medium. The image forming unit 17 is a printer, for example, for forming an image based on an electrophotographic system or an inkjet method. In the electrophotographic system, an image is formed by transferring toner attached to a photoconductor drum to a recording medium, such as a sheet. In the inkjet method, an image is formed by ejecting ink onto a recording medium.

The communication IF 18 sends and receives various items of data with other devices via a network.

In the exemplary embodiments, the CPU 11, the RAM 12, the ROM 13, and the HDD 14 form a controller (processing device) 100 which controls the individual elements of the image forming apparatus 10.

(Operation of Image Forming Apparatus 10)

By using the above-described image forming apparatus 10, a user can make a copy of a document, for example. More specifically, the image reader 16 reads a document and generates image information concerning the document, and based on this image information, the image forming unit 17 forms an image on a recording medium. The user can also perform printing as a result of sending a print job to the image forming apparatus 10 by using an external device (not shown), such as a personal computer (PC), via the communication IF 18 and a network (not shown), such as a local area network (LAN), connected to the image forming apparatus 10. More specifically, the image forming unit 17 forms an image on a recording medium based on image information indicated by the print job. The user can also perform fax sending and receiving. More specifically, the user can send image information about a document read by the image reader 16 via a network and the communication IF 18. The user can also scan a document. More specifically, the user can store image information about a document read by the image reader 16 in an external device via a network and the communication IF 18.

(Operation Panel 15)

The operation panel 15 will be discussed in detail.

As discussed above, the operation panel 15 is a touch panel, for example. Forming the operation panel 15 as a touch panel allows various items of information, such as image forming conditions of the image forming apparatus 10, to be displayed on the touch panel. The user touches the touch panel to input various items of information such as image forming conditions.

The operation panel 15 is operated as follows.

Figure 2:
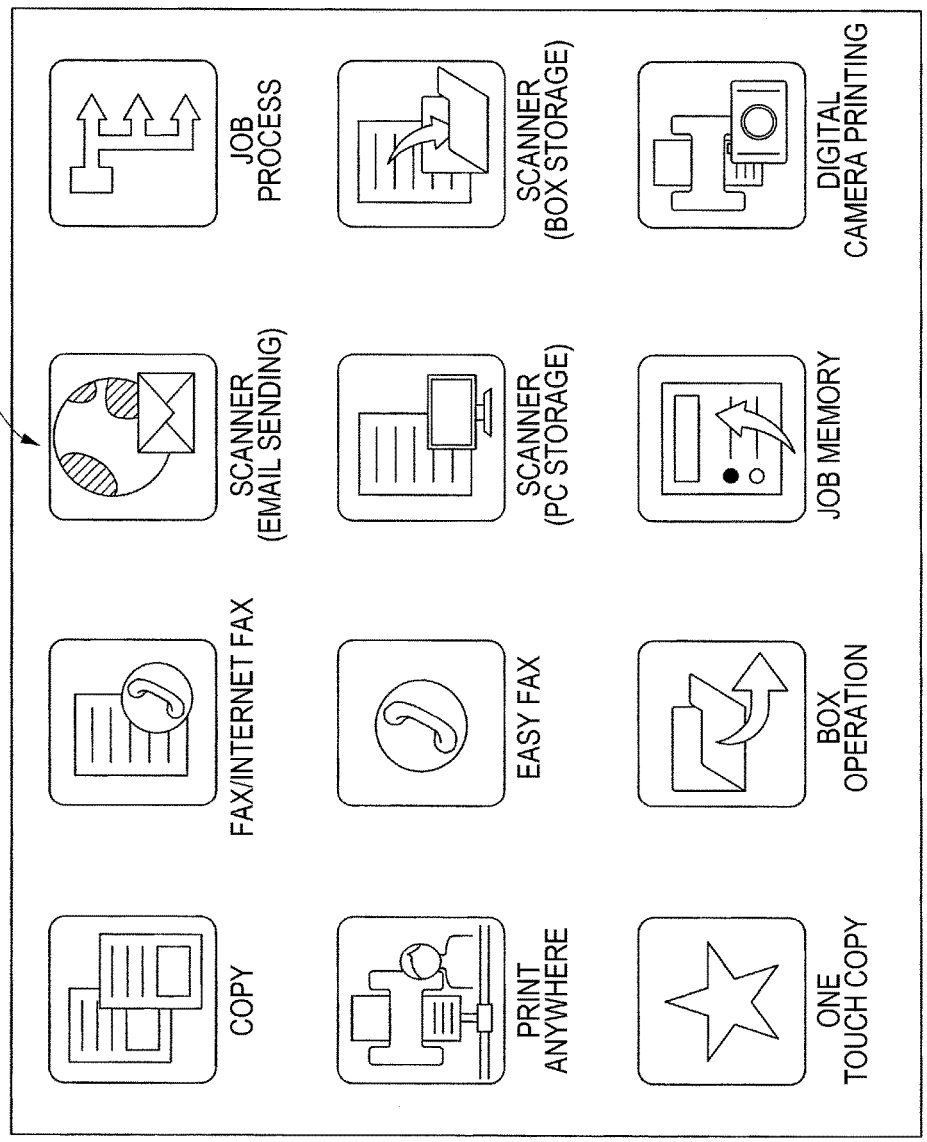
FIG. 2 illustrates an example of an image displayed on an operation panel.

FIG. 2 illustrates an example of an image displayed on the operation panel 15.

On the operation panel 15, a list of icons I used for performing functions of the image forming apparatus 10 is displayed as an image. The image displayed on the operation panel 15 represents a so-called home screen. The home screen is an example of a first image including icons I. The icons I are examples of processing selectors that are related to predetermined operations. When one of the processing selectors is selected, it executes the related processing.

In the example shown in FIG. 2, the operation panel 15 displays icons I representing functions such as copy, fax/Internet fax, scanner (email sending), job process, print anywhere, easy fax, scanner (PC storage), scanner (box storage), one touch copy, box operation, job memory, and digital camera printing. These functions form a list of icons I.

To use a desired function, the user performs a selecting operation for selecting one of the icons I.

In this case, the user simply touches an icon I to select a desired function. When the user touches an icon I, a setting screen for the function related to the touched icon I is displayed. Touching the icon I "copy", for example, displays a setting screen for instructing the user to set settings for making a copy of a document, such as the number of copies, the type of sheet, the enlargement or reduction ratio, and whether to perform monochromatic or color printing. After setting these settings, the user presses a start button (not shown), for example, to start the copy operation.

The operation panel 15 serves as a display that displays icons (processing selectors) I.

In the exemplary embodiments, the icon I "one touch copy" is a so-called one touch app. A one touch app is created as a result of a user setting desirable settings in advance for processing to be executed. That is, when a one touch app is created, it means that settings selected by the user for processing to be executed, such as the number of copies and the type of sheet, are already set. Then, by touching the icon I "one touch copy", the user can execute the processing speedily. Preparing one touch apps saves the time and efforts for the user to set complicated settings every time the user executes processing. There are two types of one touch apps. In one type, when the user touches an icon I, a job immediately starts (direct execution). In the other type, when the user touches an icon I, a check screen is first displayed, and after the user checks the screen and presses a start button, a job starts (checked execution). If the user selects an icon I of a direct-execution one touch app, the related processing may immediately be started.

When an alarm, a warning, or a help is given to a user on the operation panel 15, another image may be displayed on this home screen (first image). This image is an example of a second image, such as a banner.

Figure 3A:
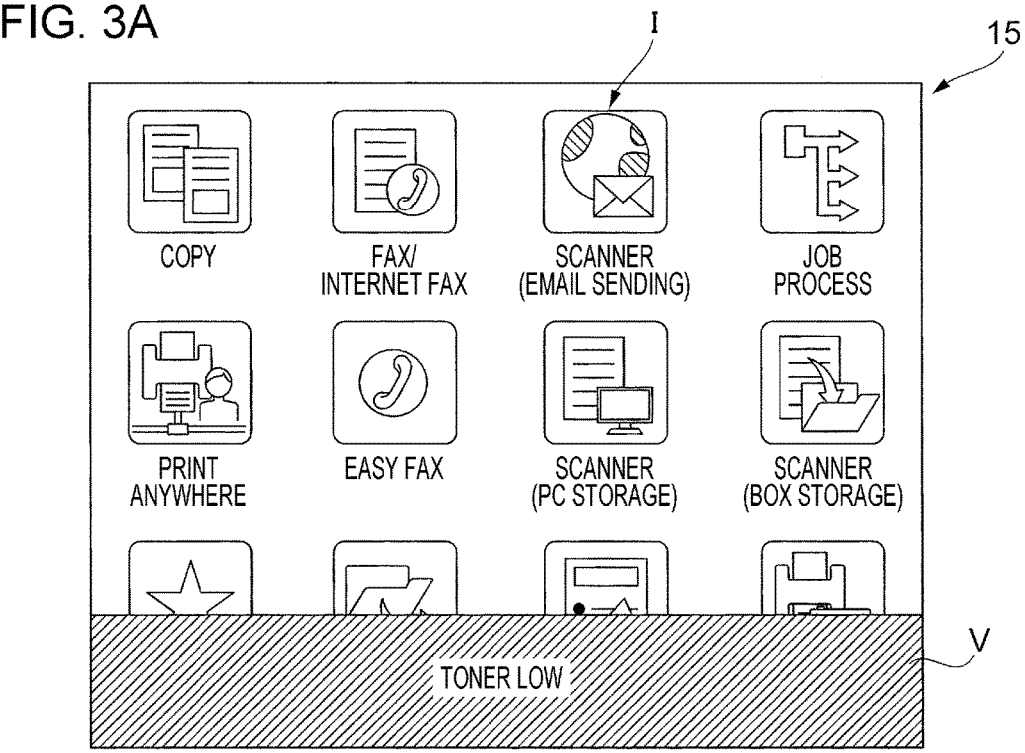
FIGS. 3A and 3B illustrate examples of a display state in which a banner (second image) is displayed on a home screen (first image) shown in FIG. 2.
Figure 3B:
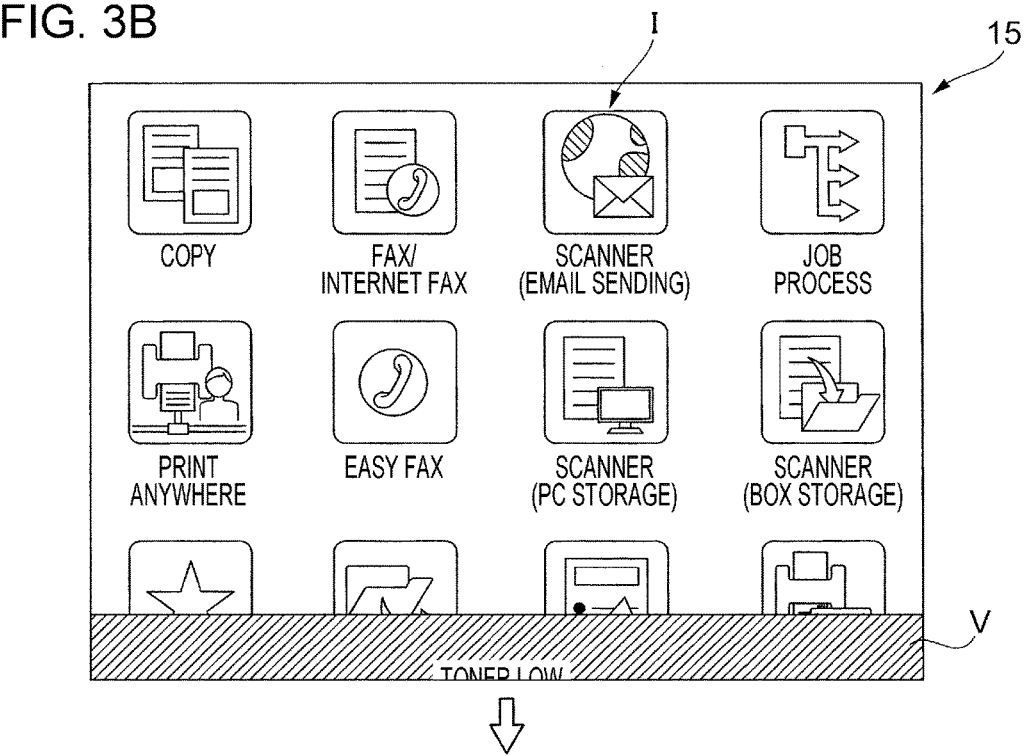

FIGS. 3A and 3B illustrate examples a display state in which a banner (second image) is displayed on the home screen (first image) shown in FIG. 2.

In the example in FIG. 3A, a banner V (second image) is displayed at the bottom of the home screen (first image). In the exemplary embodiments, hereinafter, the state in which the second image, such as a banner V, is superposed on part of an icon I on the first image, such as a home screen, may be called a "superposing state".

In the exemplary embodiments, as a warning to a user, a banner V "Toner Low" is displayed on the home screen. The banner V is first displayed at the bottom of the home screen, and after the lapse of a predetermined time, the display state of the banner V is changed. In this example, the banner V disappears while making an animated motion. The banner V also disappears while making an animated motion when the user performs a certain checking operation such as touching the banner V.

More specifically, the banner V is displayed at the bottom of the home screen, as shown in FIG. 3A, and then, starts to slide toward downward of the home screen (animated motion) and disappears outside the home screen. FIG. 3B illustrates a state in which the banner V is making an animated motion. After the banner V has completely disappeared outside the home screen, the home screen returns to the regular home screen shown in FIG. 2.

In the exemplary embodiments, when the banner V is displayed at the bottom of the home screen, as shown in FIG. 3A, among the icons I displayed on the home screen, icons I at the bottommost row are partially hidden by the banner V. While the banner V is making an animated motion, these icons I may also be partially hidden by the banner V, as shown in FIG. 3B.

However, even in the state in which icons I are partially hidden by the banner V, it is still possible to select one of these icons I in the related art. In such a case, the following situation may occur. When the user means to touch the banner V, the banner V may not exist any longer at the portion touched by the user because the banner V is moving by making an animated motion. If an icon I exists at this portion, it means that the user has touched the icon I instead of the banner V to select processing related to this icon I. As a result, the processing related to the icon I is started. If the icon I touched by the user is a direct-execution one touch app, the processing may immediately be started, as discussed above. That is, the image forming apparatus 10 performs an operation that the user does not intend to do.

In the exemplary embodiments of the invention, to address the above-described situation, a different approach to receiving a selecting operation from a user is taken in accordance with whether the second image, such as a banner V, is being displayed.

The configuration of the controller 100 that implements this operation will be described below.

(Controller 100)

Figure 4:
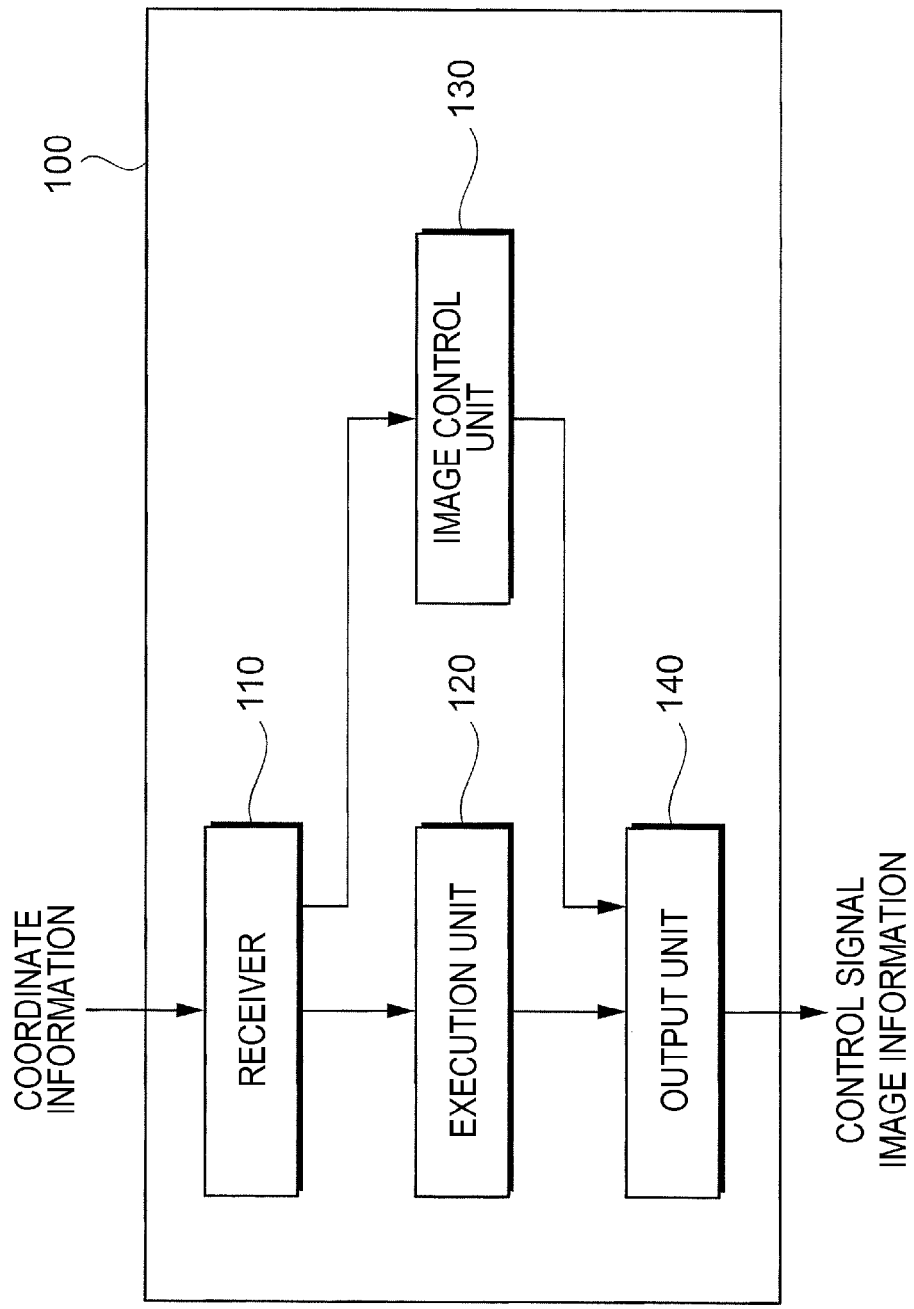
FIG. 4 is a block diagram illustrating an example of the functional configuration of a controller.

FIG. 4 is a block diagram illustrating an example of the functional configuration of the controller 100. In FIG. 4, among various functions of the controller 100, functions only related to the exemplary embodiments are shown.

As shown in FIG. 4, the controller 100 includes a receiver 110, an execution unit 120, an image control unit 130, and an output unit 140.

The receiver 110 receives the selection of an icon I from the operation panel 15. The receiver 110 obtains coordinate information from the operation panel 15. The coordinate information indicates the position on the operation panel 15 at which a finger of the user, for example, is touching. Then, the receiver 110 detects which icon I is being selected, based on the coordinate information. The receiver 110 also determines whether to receive the selection from the user in accordance with the type of operation performed by the user. More specifically, the receiver 110 determines whether the operation performed by the user is a touch operation or a push and holding operation, based on the obtained coordinate information, and then decides whether to receive the selection from the user. When the first image, such as a home screen, is displayed, the receiver 110 takes a different approach to receiving a selecting operation from a user in accordance with whether the display state is a superposing state in which the second image, such as a banner V, is superposed on part of an icon I on the first image. For example, when the user performs a selecting operation such as touching an icon I, the receiver 110 takes a different approach to receiving this selecting operation in accordance with whether the second image is superposed on part of the first image (superposing state), such as the case shown in FIG. 3A or 3B, or the second image is not superposed on the first image (non-superposing state), such as the case shown in FIG. 2. This will be described in detail later.

When the receiver 100 has received the selection of an icon I, the execution unit 120 executes processing related to this icon I. More specifically, the execution unit 120 outputs a control signal to the individual elements of the image forming apparatus 10 so as to control them, thereby implementing processing selected by the user.

In the case of scanning processing, for example, the execution unit 120 executes reading processing to read an image of a document by controlling the image reader 16. The execution unit 120 then executes image processing on the read image and outputs the resulting image information from the output unit 140. The output unit 140 will be discussed later. In the case of copying processing, the execution unit 120 executes reading processing to read an image of a document by controlling the image reader 16. The execution unit 120 then executes image processing on the read image and outputs the resulting image information to the image forming unit 17. The execution unit 120 then performs printing by controlling the image forming unit 17.

The image control unit 130 controls the displaying of an image on the operation panel 15. That is, the image control unit 130 generates image information concerning an image such as that shown in FIG. 2, 3A, or 3B, and outputs the generated image information from the output unit 140. Then, an image such as that shown in FIG. 2, 3A, or 3B is displayed on the operation panel 15.

The output unit 140 outputs a control signal to each of the elements of the image forming apparatus 10. The output unit 140 also outputs image information if necessary.

Operations performed by the controller 100 will be described below in greater detail. Different operations performed by the controller 100 will be described in first through fourth exemplary embodiments.

[First Exemplary Embodiment]

In the first exemplary embodiment, when the display state is a superposing state, the receiver 110 does not receive an operation from a user for a predetermined time, and when the display state is a non-superposing state, the receiver 110 receives an operation from a user. More specifically, the receiver 110 does not receive an operation from a user during a period while the second image, such as a banner V, is making an animated motion, for example, to disappear.

That is, if the second image, such as a banner V, is displayed on part of an icon I, as shown in FIG. 3A or 3B, the receiver 110 does not receive an operation from a user for a predetermined time.

Figure 5:
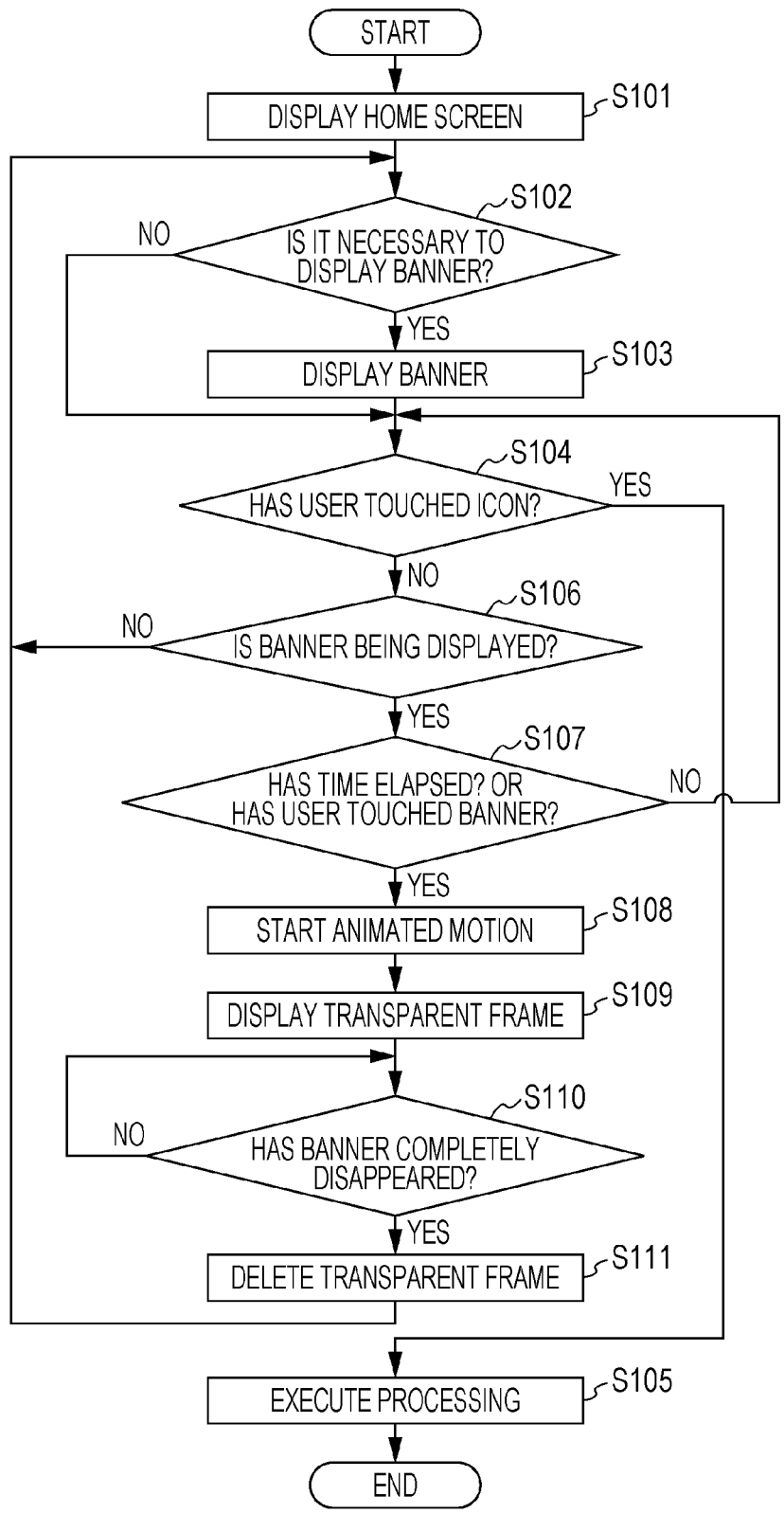
FIG. 5 is a flowchart illustrating an operation performed by the controller in a first exemplary embodiment.

FIG. 5 is a flowchart illustrating an operation performed by the controller 100 in the first exemplary embodiment.

In step S101, the image control unit 130 displays a home screen (first image) including icons I on the operation panel 15.

Then, in step S102, the image control unit 130 determines whether it is necessary to display a banner V (second image) on the operation panel 15. As described above, a banner V is displayed when an alarm, a warning, or a help is given to a user.

If it is not necessary to display a banner V (NO in step S102), the process proceeds to step S104.

If it is necessary to display a banner V (YES in step S102), the image control unit 130 displays a banner V on the home screen in step S103.

Then, in step S104, the receiver 110 determines whether the user has touched an icon I.

If the user has touched an icon I (YES in step S104), in step 5105, the execution unit 120 executes processing related to the touched icon I.

If the user has not touched an icon I (NO in step S104), the image control unit 130 determines in step S106 whether a banner V is being displayed.

If a banner V is not being displayed (NO in step S106), the process returns to step S102.

If a banner V is being displayed (YES in step S106), the image control unit 130 determines in step S107 whether a predetermined time has elapsed after the banner V has started to be displayed or whether the user has touched the banner V (checking operation).

If the predetermined time has not elapsed nor has the user touched the banner V (NO in step S107), the process returns to step S104.

If the predetermined time has elapsed or if the user has touched the banner V (YES in step S107), in step S108, the image control unit 130 causes the banner V to start making an animated motion to disappear. In this case, in step S109, the image control unit 130 displays a transparent frame in an area on the operation panel 15 other than the banner V. Even if the user performs an operation on this area such as touching this area, the operation is disabled. That is, the receiver 110 does not receive an operation from the user.

Then, in step S110, the image control unit 130 determines whether the banner V has completely disappeared.

If the banner V has not completely disappeared (NO in step S110), the process returns to step S110.

If the banner V has completely disappeared (YES in step S110), the image control unit 130 continues displaying the transparent frame for a predetermined time (for example, 500 ms), and deletes the transparent frame in step S111. The receiver 110 is then ready to receive an operation from the user. The process then returns to step S102.

In the first exemplary embodiment, the receiver 110 does not receive an operation from a user while a banner V is making an animated motion to disappear. That is, when the display state is a superposing state, an operation is not received from a user for a predetermined time. While a banner V is making an animated motion, a user may be likely to touch an icon I while intending to touch the banner V. During this animated motion, an operation is not received from a user. As a result, the possibility that a user inadvertently selects an icon I instead of a banner V is reduced. That is, the possibility that, when a user tries to select a certain item, the user inadvertently selects another item is reduced. It is thus less likely that the image forming apparatus 10 will perform an operation that the user does not intend to do.

[Second Exemplary Embodiment]

In the second exemplary embodiment, when the second image, such as a banner V, is superposed on part of an icon I selected by a user, the receiver 110 does not receive the selection of this icon I. When the second image, such as a banner V, is not superposed on an icon I selected by a user, the receiver 100 receives the selection of this icon I.

That is, when the second image, such as a banner V, is superposed on part of an icon I, as shown in FIG. 3A or 3B, the receiver 110 does not receive an operation from a user.

A determination as to whether the banner V is superposed on part of the icon I selected by the user may be made from the coordinates of the icon I or the banner V on the operation panel 15. It is assumed, for example, that the operation panel 15 has a resolution of 800 pixels in the X (horizontal) direction by 480 pixels in the Y (vertical) direction. In this case, the position of each pixel of the operation panel 15 can be represented by (X, Y) coordinates (1≤X≤800, 1≤Y≤480). It is also assumed that an icon I has a size of 190 pixels in the X (horizontal) direction by 190 pixels in the Y (vertical) direction and that a banner V has a size of 800 pixels in the X (horizontal) direction by 80 pixels in the Y (vertical) direction. If the banner V is displayed at the bottom of the operation panel 15, as shown in FIG. 3A, it is displayed in a rectangular region (1≤X≤800, 1≤Y≤80) on the operation panel 15. In this case, if the Y coordinate of the bottom portion of an icon I on the operation panel 15 is 81 or greater, the banner V is not superposed on the icon I. If the Y coordinate of the bottom portion of an icon I is 80 or smaller, the banner V is superposed on the icon I (such a superposing state includes a state in which the icon I and the banner V are not superposed but contact each other).

Figure 6:
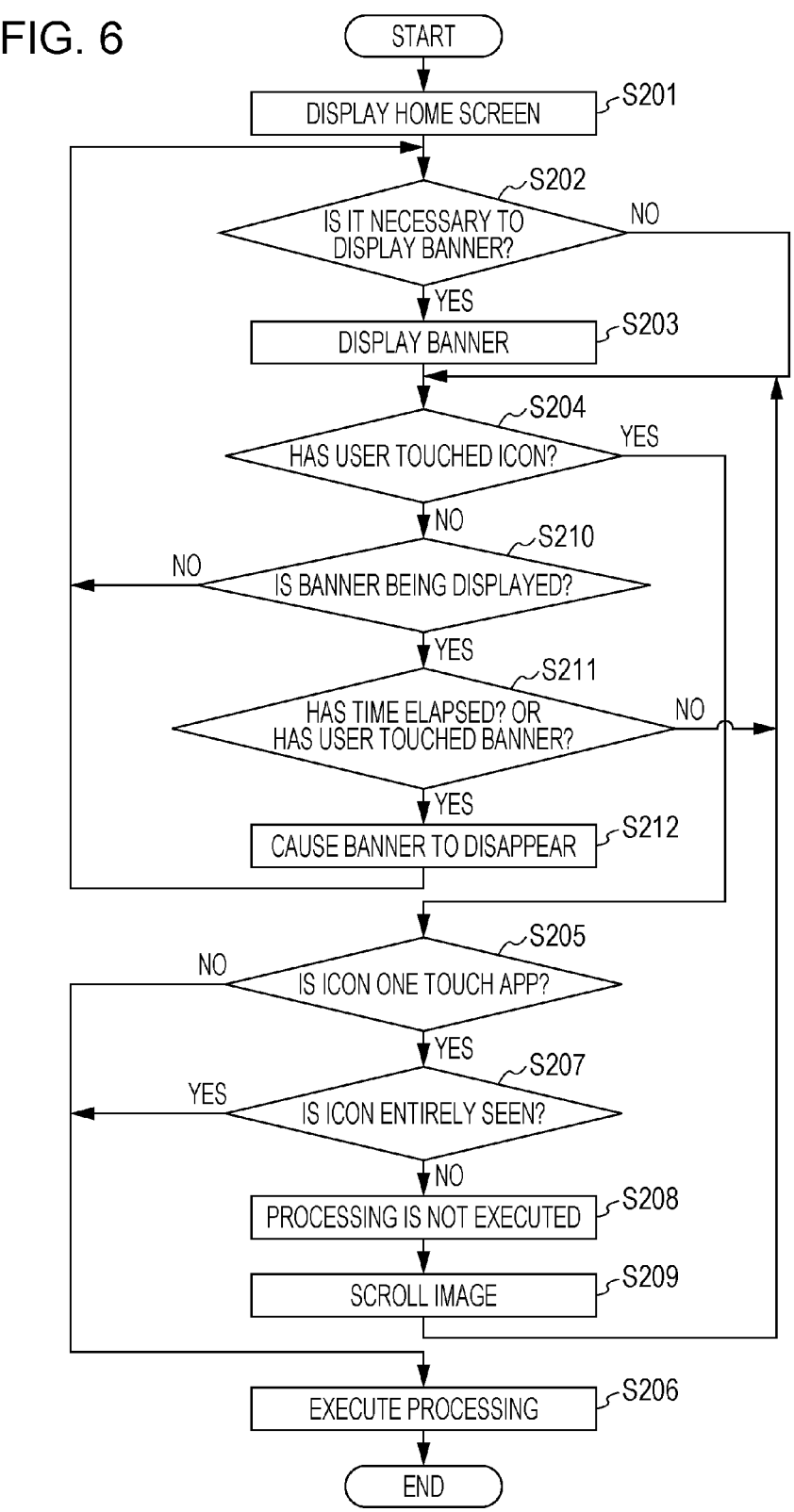
FIG. 6 is a flowchart illustrating an operation performed by the controller in a second exemplary embodiment.

FIG. 6 is a flowchart illustrating an operation performed by the controller 100 in the second exemplary embodiment.

Steps S201 through S203 are similar to steps S101 through S103 in FIG. 5, and an explanation thereof will thus be omitted.

Step S204 and the subsequent steps are executed as follows.

In step S204, the receiver 110 determines whether the user has touched an icon I.

If the user has touched an icon I (YES in step S204), the receiver 110 determines in step S205 whether the selected icon I is a one touch app.

If the selected icon I is not a one touch app (NO in step S205), the execution unit 120 executes processing related to the selected icon I in step S206.

If the selected icon I is a one touch app (YES in step S205), the receiver 110 determines in step S207 whether the selected icon I is entirely seen without being hidden by the banner V.

If the selected icon I is entirely seen (YES in step S207), the process proceeds to step S206, and the execution unit 120 executes the one touch app.

If the selected icon I is partially hidden by the banner V and is not entirely seen (NO in step S207), the receiver 110 does not receive the selection of this icon I, and the execution unit 120 does not execute the one touch app in step S208. Then, in step S209, the image control unit 130 scrolls the image so that the selected icon I can be entirely seen. The process then returns to step S204.

If the user has not touched an icon I (NO in step S204), the image control unit 130 determines in step S210 whether a banner V is being displayed.

If a banner V is not being displayed (NO in step S210), the process returns to step S202.

If a banner V is being displayed (YES in step S210), the image control unit 130 determines in step S211 whether a predetermined time has elapsed after the banner V has started to be displayed or whether the user has touched the banner V (checking operation).

If the predetermined time has not elapsed nor has the user touched the banner V (NO in step S211), the process returns to step S204.

If the predetermined time has elapsed or if the user has touched the banner V (YES in step S211), in step S212, the image control unit 130 causes the banner V to disappear. The process then returns to step S202.

In the second exemplary embodiment, the receiver 110 does not receive the selection of an icon I if a banner V is superposed on part of this icon I. As a result, the possibility that a user inadvertently selects an icon I instead of a banner V is reduced. The image forming apparatus 10 is thus less likely to perform an operation that a user does not intend to do.

[Third Exemplary Embodiment]

In the third exemplary embodiment, the receiver 110 changes a selecting operation that a user is instructed to perform for receiving the selection of a processing selector in accordance with whether the display state is a superposing state or a non-superposing state. More specifically, when the display state is a superposing state, the receiver 110 decreases the range of an area where the selection of an icon I is found to be received to be smaller than that when the display state is a non-superposing state.

That is, when the second image, such as a banner V, is being displayed, as shown in FIG. 3A or 3B, the receiver 110 decreases the range of an area on the screen where the selection of an icon I is found to be received to be smaller. That is, when a banner V is being displayed, the receiver 110 instructs a user to touch a smaller range of an area on the icon I to perform a selecting operation.

Figure 7:
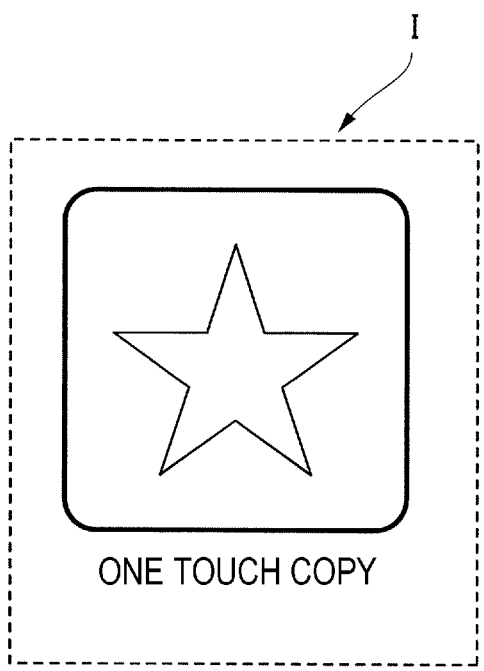
FIG. 7 illustrates a state in which the range of an area on the screen where the selection of an icon is found to be received is decreased.

FIG. 7 illustrates a state in which the range of an area on the screen where the selection of an icon I is found to be received is decreased.

The range defined by the dashed lines in FIG. 7 represents the state before the range of an area on the screen where the selection of the icon I is found to be received has been decreased. When the user touches anywhere within this range, the selection of the icon I is received. In this case, the range including an area where the image of the icon I is displayed and an area where the name of the icon I is displayed is the range of the area where the selection of the icon I is found to be received.

In contrast, the range defined by the thick lines in FIG. 7 represents the state after the range of an area on the screen where the selection of an icon I is found to be received has been decreased. In this case, the range of an area on the screen where the selection of an icon I is found to be received is limited to an area where the image of the icon I is displayed. That is, unless the user touches a portion within this range, the selection of the icon I is not received.

Figure 8:
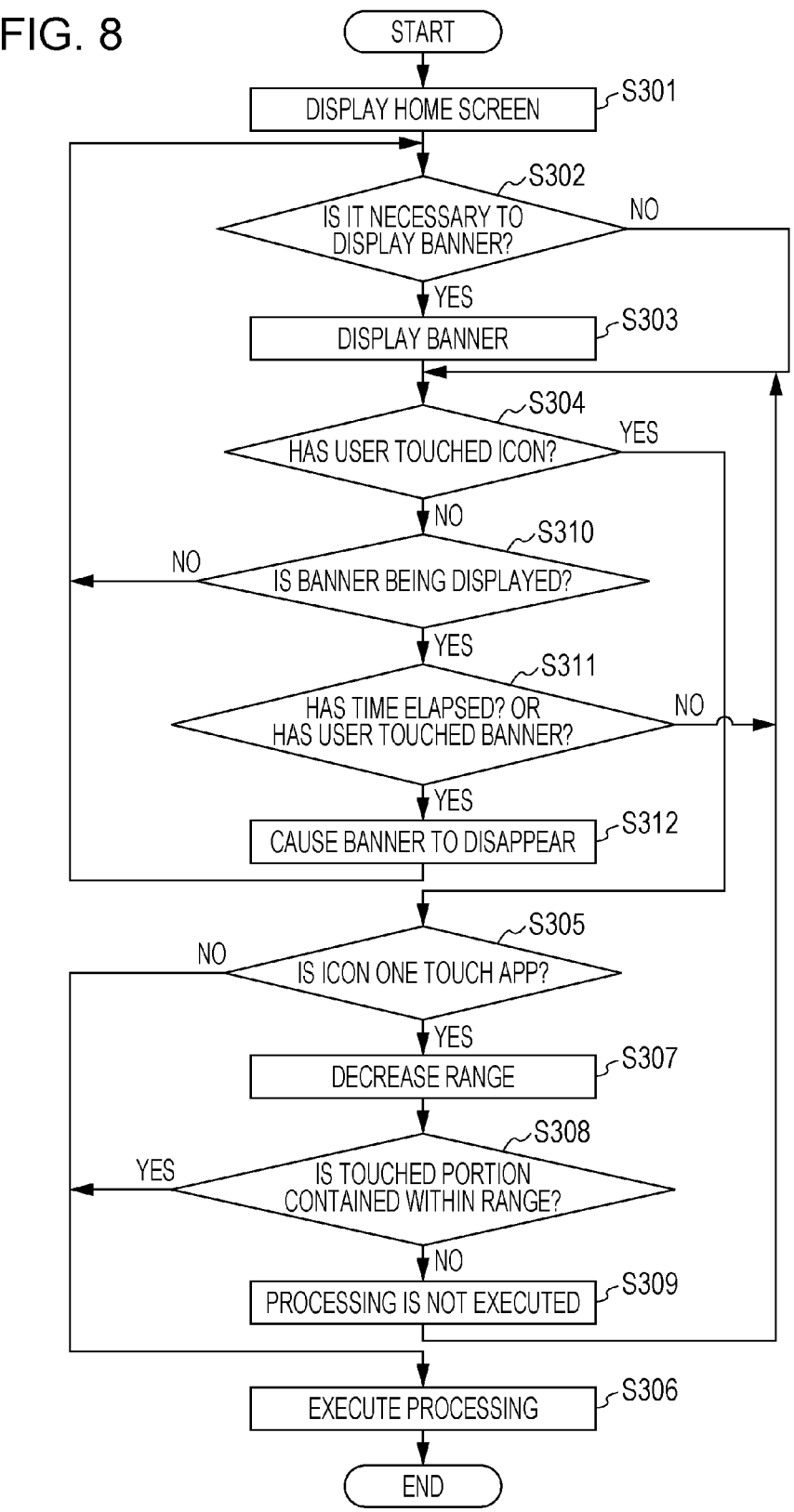
FIG. 8 is a flowchart illustrating an operation performed by the controller in a third exemplary embodiment.

FIG. 8 is a flowchart illustrating an operation performed by the controller 100 in the third exemplary embodiment.

Steps S301 through S306 are similar to steps S201 through S206 in FIG. 6, and an explanation thereof will thus be omitted.

Step S307 and the subsequent steps are executed as follows.

If the selected icon I is a one touch app (YES in step S305), in step S307, the receiver 110 decreases the range of an area on the screen where the selection of an icon I is found to be received to be smaller than that when the display state is a non-superposing state.

Then, in step S308, the receiver 110 determines whether the portion touched by the user is contained within the decreased range.

If the portion is contained within the decreased range (YES in step S308), the process proceeds to step S306, and the execution unit 120 executes the one touch app.

If the portion is not contained within the decreased range (NO in step S308), the receiver 110 does not receive the selection of this icon I, and the execution unit 120 does not execute the one touch app in step S309. The process then returns to step S304.

Steps S310 through S312 are similar to steps S210 through S212 in FIG. 6, and an explanation thereof will thus be omitted.

In the third exemplary embodiment, when the display state is a superposing state, the receiver 110 decreases the range on the screen where the selection of this icon I is found to be received to be smaller than that when the display state is a non-superposing state. As a result, the possibility that a user inadvertently selects an icon I instead of a banner V is reduced. The image forming apparatus 10 is thus less likely to perform an operation that a user does not intend to do.

[Fourth Exemplary Embodiment]

In the fourth exemplary embodiment, as well as in the third exemplary embodiment, the receiver 110 changes a selecting operation that a user is instructed to perform for receiving the selection of a processing selector in accordance with whether the display state is a superposing state or a non-superposing state. In the fourth exemplary embodiment, however, when the display state is a superposing state, the receiver 110 receives the selection of an icon I as a result of a user keeping holding down this icon I. When the display state is a non-superposing state, the receiver 110 receives the selection of an icon I as a result of a user touching this icon I. A determination as to whether the user has kept holding down an icon I or touched an icon I may be made according to the time for which a finger of a user has contacted the operation panel 15. If the time from when a finger of the user starts to contact the operation panel 15 until when the finger is released from the operation panel 15 is equal to or longer than a predetermined time (for example, one second), it is determined that the user has kept holding down the icon I. If the time for which the finger has contacted the icon I is shorter than this predetermined time, it is determined that the user has touched the icon I.

That is, when the second image, such as a banner V, is being displayed, as shown in FIG. 3A or 3B, the receiver 110 receives the selection of an icon I when a user has kept holding down this icon I. That is, when a banner V is being displayed, the receiver 110 instructs the user to keep holding down the icon I to perform a selecting operation.

FIG. 9 is a flowchart illustrating an operation performed by the controller 100 in the fourth exemplary embodiment.

Steps S401 through S406 are similar to steps S201 through S206 in FIG. 6, and an explanation thereof will thus be omitted.

Step S407 and the subsequent steps are executed as follows.

If the selected icon I is a one touch app (YES in step S405), the receiver 110 determines in step S407 whether the user has kept holding down the icon I.

If the user has kept holding down the icon I (YES in step S407), the process proceeds to step S406, and the execution unit 120 executes the one touch app.

If the user has not kept holding down the icon I, in other words, if the user has touched the icon I (NO in step S407), the receiver 110 does not receive the selection of this icon I, and the execution unit 120 does not execute the one touch app in step S408. The process then returns to step S404.

Steps S409 through S411 are similar to steps S210 through S212 in FIG. 6, and an explanation thereof will thus be omitted.

In the fourth exemplary embodiment, when the display state is a superposing state, the receiver 110 does not receive the selection of an icon I unless this icon I is kept holding down. As a result, the possibility that a user inadvertently selects an icon I instead of a banner V is reduced. The image forming apparatus 10 is thus less likely to perform an operation that a user does not intend to do.

In the above-described exemplary embodiments, the processing device is applied to the image forming apparatus 10 by way of example. However, the processing device may be applicable to a device which is capable of performing an input operation by touching a display. For example, the processing device may be applicable to devices that display application software icons side by side, such as a mobile phone, a smartphone, and a tablet.

In the above-described exemplary embodiments, the case in which a user inadvertently selects an icon I (processing selector) instead of a banner V (second image) has been discussed. However, the opposite case may also hold true. That is, the user may inadvertently select a banner V (second image) instead of an icon I (processing selector). The exemplary embodiments are also applicable to this case. In this case, the possibility that a user inadvertently selects a banner V (second image) instead of an icon I (processing selector) is reduced. That is, the possibility that, when a user tries to select a certain item, the user inadvertently selects another item is reduced. It is thus less likely that the image forming apparatus 10 will perform an operation that the user does not intend to do.

In the above-described exemplary embodiments, the first image is a home screen. However, this is only an example. In the above-described exemplary embodiments, the second image is an image of a banner V. However, this is only an example, and the second image may be another image, such as a popup image.

In the second through fourth exemplary embodiments, the receiver 110 changes the condition for receiving a selecting operation when an icon I of a one touch app and the second image, such as a banner V, are superposed on each other. However, this configuration is only an example. The receiver 110 may change the condition for receiving a selecting operation when an icon I of an app, which is not a one touch app, and the second image, such as a banner V, are superposed on each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing device comprising:
    a receiver that receives selection of a processing selector displayed on a display, the processing selector being related to predetermined processing and executing the predetermined processing when the processing selector is selected;
    an execution unit that executes the predetermined processing when the selection of the processing selector is received; and
    an image control unit that controls displaying of an image on the display, wherein
    when the image control unit causes the display to display a first image including the processing selector, the receiver takes a first approach to receiving the selection of the processing selector when a second image is superposed on part of the processing selector and the processing selector is only partially hidden by the second image, and takes a second approach, which is different from the first approach, when the second image is not superposed on the processing selector,
    in the first approach, the predetermined processing of the processing selector is disabled, and
    in the second approach, the predetermined processing of the processing selector is not disabled.

2. The processing device according to claim 1, wherein, if the second image is superposed on part of the processing selector, the receiver does not receive an operation from a user for a predetermined time, and if the second image is not superposed on the processing selector, the receiver receives an operation from a user.

3. The processing device according to claim 2, wherein, if the second image is superposed on part of the processing selector, the receiver does not receive an operation from a user during the predetermined time for which an operation for changing a display state of the second image is being performed.

4. The processing device according to claim 1, wherein, if the second image is superposed on part of the processing selector selected by a user, the receiver does not receive the selection of the processing selector, and if the second image is not superposed on the processing selector, the receiver receives the selection of the processing selector.

5. The processing device according to claim 1, wherein the receiver changes a selecting operation that a user is instructed to perform for receiving the selection of the processing selector in accordance with whether the second image is superposed on part of the processing selector or the second image is not superposed on the processing selector.

6. The processing device according to claim 5, wherein, in a case in which the second image is superposed on part of the processing selector, the receiver decreases a range of an area on the display where the selection of the processing selector is found to be received to be smaller than the range of the area in a case in which the second image is not superposed on the processing selector.

7. The processing device according to claim 5, wherein, if the second image is superposed on part of the processing selector, the receiver receives the selection of the processing selector when the processing selector is touched and held down, and if the second image is not superposed on the processing selector, the receiver receives the selection of the processing selector when the processing selector is touched and not held down.

8. The processing device according to claim 1, wherein the receiver takes a different approach to receiving the selection of the processing selector if the processing selector is a processing selector which is created when a user sets desired settings for processing in advance and if the second image is superposed on part of the processing selector.

9. An image forming apparatus comprising:
    an image forming unit that forms an image on a recording medium;
    a display that displays a processing selector which is related to predetermined processing and which executes the predetermined processing when the processing selector is selected; and
    a controller that controls the image forming apparatus, the controller including:
        a receiver that receives the selection of the processing selector,
        an execution unit that executes the predetermined processing when the selection of the processing selector is received, and
        an image control unit that controls displaying of an image on the display, wherein
    when the image control unit causes the display to display a first image including the processing selector, the receiver takes a first approach to receiving the selection of the processing selector when a second image is superposed on part of the processing selector and the processing selector is only partially hidden by the second image, and takes a second approach, which is different from the first approach, when the second image is not superposed on the processing selector,
    in the first approach, the predetermined processing of the processing selector is disabled, and
    in the second approach, the predetermined processing of the processing selector is not disabled.

10. A non-transitory computer readable medium storing a program causing a computer to execute a process, the process comprising:
    receiving selection of a processing selector displayed on a display, the processing selector being related to predetermined processing and executing the predetermined processing when the processing selector is selected;
    executing the predetermined processing when the selection of the processing selector is received; and
    controlling displaying of an image on the display, wherein
    when the display displays a first image including the processing selector, a first approach to receiving the selection of the processing selector is taken when a second image is superposed on part of the processing selector and the processing selector is only partially hidden by the second image, and takes a second approach, which is different from the first approach, when the second image is not superposed on the processing selector, in the first approach, the predetermined processing of the processing selector is disabled, and in the second approach, the predetermined processing of the processing selector is not disabled.

* * * * *